(12) United States Patent
Takarada (10) Patent No.: US 8,422,973 B2
(45) Date of Patent: Apr. 16, 2013

(54) BIDIRECTIONAL TRANSMISSION COIL AND BIDIRECTIONAL TRANSMISSION SYSTEM USING THE SAME

(75) Inventor: Mitsuo Takarada, Saitama (JP)

(73) Assignee: B & Plus K.K., Saitama (JP)

( * ) Notice: Subject to any disclaimer, the term of this patent is extended or adjusted under 35 U.S.C. 154(b) by 116 days.

(21) Appl. No.: 13/142,989

(22) PCT Filed: Jun. 16, 2009

(86) PCT No.: PCT/JP2009/060943
§ 371 (c)(1),
(2), (4) Date: Jun. 30, 2011

(87) PCT Pub. No.: WO2010/146662
PCT Pub. Date: Dec. 23, 2010

(65) Prior Publication Data
US 2011/0269398 A1    Nov. 3, 2011

(51) Int. Cl.
*H04B 1/06* (2006.01)
*H04B 7/00* (2006.01)

(52) U.S. Cl.
USPC ....... 455/274; 455/269; 455/278.1; 455/41.1; 455/575.1; 455/575.7; 343/742; 343/842; 343/866; 343/867; 340/572.1; 340/572.7

(58) Field of Classification Search .......... 455/41.1, 455/78–82, 121–125, 269–275, 276.1, 277.1, 455/277.2, 278.1, 279.1, 280–294, 575.1, 455/575.7; 343/741, 742, 841, 842, 866, 343/867; 340/572.1, 572.7
See application file for complete search history.

(56) References Cited

U.S. PATENT DOCUMENTS

| 5,963,173 | A  | * | 10/1999 | Lian et al. ...................... 343/742 |
| 6,137,447 | A  | * | 10/2000 | Saitoh et al. .................. 343/742 |
| 6,378,774 | B1 | * | 4/2002  | Emori et al. ................... 235/492 |

(Continued)

FOREIGN PATENT DOCUMENTS

| JP | 2000-105800 A | 4/2000 |
| JP | 2000-215282 A | 8/2000 |

(Continued)

OTHER PUBLICATIONS

International Search Report for PCT/P2009/060943, mailing date of Sep. 29, 2009.
Notification of Transmittal of Translation of the International Preliminary Report on Patentability (Form PCT/IB/338) of International Application No. PCT/JP2009/060943 mailed Jan. 26, 2012 with forms PCT/IB/373 and PCT/ISA/237.

*Primary Examiner* — Tuan A Tran
(74) *Attorney, Agent, or Firm* — Westerman, Hattori, Daniels & Adrian, LLP (57) ABSTRACT

There is provided a bidirectional transmission coil capable of miniaturizing a structure and carrying out reliable transmission of a data signal. A transmitting coil L1 generates a magnetic flux of a transmission signal by a high frequency signal applied thereto. A receiving coil L2 is arranged to be positioned concentrically with the transmitting coil L1, for inducing a reception signal by the magnetic flux from outside. A first cancel coil Lac is connected to the transmitting coil L1 in series so as to be led-out from a middle of the transmitting coil L and is led-in to the lead-out part. The first cancel coil Lac is arranged so as to sandwich the receiving coil L2 between the first cancel coil Lac and the transmitting coil L1, wherein the magnetic flux in a direction opposite to the magnetic flux from the transmitting coil L1 is generated in the receiving coil L2.

10 Claims, 7 Drawing Sheets

U.S. PATENT DOCUMENTS

| | | | |
|---|---|---|---|
| 6,584,301 B1 * | 6/2003 | Bohn et al. | 455/41.1 |
| 6,791,457 B2 * | 9/2004 | Shimura | 340/448 |
| 6,801,942 B1 | 10/2004 | Dietrich et al. | |
| 7,046,208 B2 * | 5/2006 | Shishido et al. | 343/742 |
| 7,142,163 B2 * | 11/2006 | Fukano et al. | 343/742 |
| 7,230,943 B2 * | 6/2007 | Sakamoto et al. | 370/345 |
| 7,345,644 B2 * | 3/2008 | Morioka et al. | 343/866 |
| 7,562,828 B2 * | 7/2009 | Ide | 235/492 |
| 7,925,223 B2 * | 4/2011 | Raggam | 455/78 |
| 8,289,165 B2 * | 10/2012 | Forster | 340/572.7 |
| 2004/0196205 A1 | 10/2004 | Shishido et al. | |
| 2005/0134519 A1 * | 6/2005 | Fukano et al. | 343/867 |

FOREIGN PATENT DOCUMENTS

| | | |
|---|---|---|
| JP | 2001-085927 A | 3/2001 |
| JP | 2001-092930 A | 4/2001 |
| JP | 2002-109497 A | 4/2002 |
| JP | 2002-176427 A | 6/2002 |
| JP | 2003-258545 A | 9/2003 |
| JP | 2004-328722 A | 11/2004 |

* cited by examiner

BIDIRECTIONAL TRANSMISSION COIL AND BIDIRECTIONAL TRANSMISSION SYSTEM USING THE SAME

TECHNICAL FIELD

The present invention relates to a bidirectional transmission coil and a bidirectional transmission system using the same, and for example, relates to an improvement of the bidirectional transmission coil and the bidirectional transmission system suitably mounted on a remote system.

DESCRIPTION OF RELATED ART

As a structure of a remote system, for example, electric power is supplied to a remote part arranged at a moving assembly part side, from a base part arranged at a fixing part side of a manufacturing line (not shown), by electromagnetic coupling in a non-contact state, and a control data signal is bidirectionally transmitted, similarly by electromagnetic coupling in a non-contact state, between the base part and the remote part.

Figure 7:
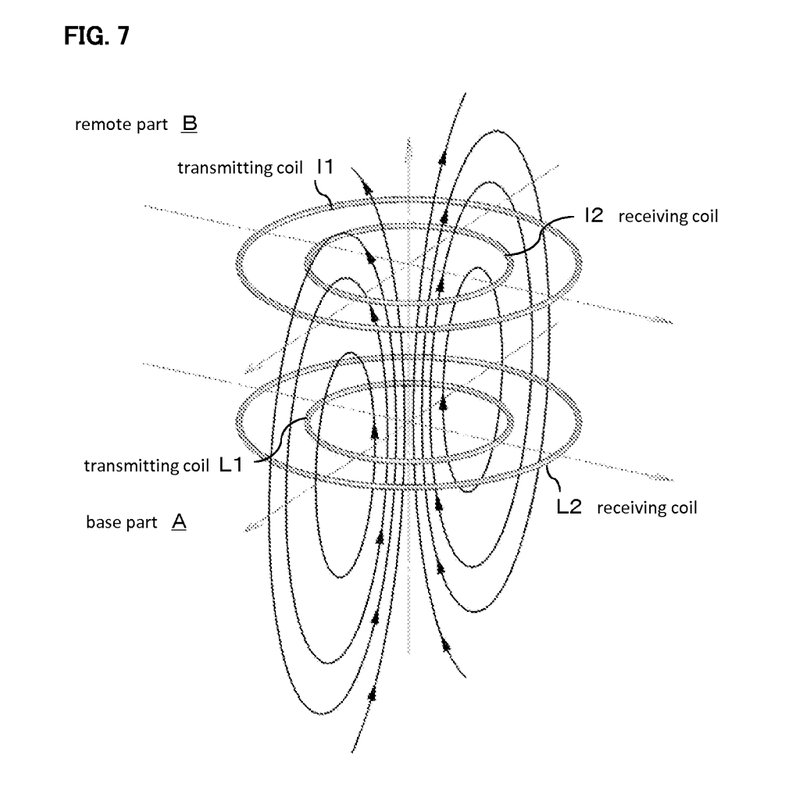
FIG. 7 is a schematic perspective view showing a conventional bidirectional transmission system.

Conventionally, in this kind of remote system, for example as shown in FIG. 7, a bidirectional transmission system using coils is known.

Such a bidirectional transmission system has a structure that a loop-like transmitting coil L1 is arranged in a base part A, and a receiving coil L2 is concentrically arranged outside of the transmitting coil L1. Meanwhile, a loop-like transmitting coil 11 is arranged in a remote part B which is arranged near the base part A, and a receiving coil 12 is concentrically arranged inside of this transmitting coil 11, so that transmitting/receiving coils L1, L2 of the base part A is faced with transmitting/receiving coils 11, 12 of the remote part B.

In such a bidirectional transmission system, in order to realize bidirectional transmission, for example, a data signal is superimposed on a high frequency signal having transmission frequency of 6 $MH_z$ and is electromagnetically transmitted to the receiving coil 12 of the remote part B from the transmitting coil L1 of the base part A, and meanwhile, the data signal is superimposed on the high frequency signal having transmission frequency of 3.58 $MH_z$ and is electromagnetically transmitted to the receiving coil L2 of the base part A from the transmitting coil 11 of the remote part B.

However, in the aforementioned bidirectional transmission system, not only an induced signal caused by a magnetic flux from the transmitting coils 11, L1 at the remote part B side and the base part A side, but also an induced signal caused by the magnetic flux from the adjacent transmitting coils L1, 11 at its own base part A side and remote part B side, is generated in the receiving coils L2 and 12 at the base part A side and the remote part B side.

In addition, interval between the transmitting and receiving coils L1 and L2, and interval between the transmitting coils 11 and 12, are narrower, and therefore the induced signal caused by the magnetic flux from closer transmitting coils L1, 11 becomes great. Accordingly, regarding the induced signal in the receiving coils L2, 12, mutual interference occurs easily between a reception signal from the base part A or the remote part B, and its own reception signal, thus possibly generating malfunction.

Therefore, in order to reduce the mutual interference of the bidirectional communication, difference in shapes of the transmitting coils L1, 11 and the receiving coils L2, 12 is made large as much as possible, in the base part A and the remote part B.

For example, when a transmission pulse width of the high frequency signal applied to the transmitting coils L1, 11 is set to 10 μsec, the transmitting coil L1 of 6 $MH_z$ is formed into seven turns (about 2.8 μH) with diameter of 20φ, and the transmitting coil 11 of 3.58 $MH_z$ is formed into five turns (about 5.8 μH) with diameter of 70φ.

Incidentally, Japanese Patent Laid Open Publication No. 2002-176427 (patent document 1) discloses a general conventional structure of the bidirectional transmission system.
(Prior Art Document)
(Patent Document)
(Patent Document 1)
Japanese Patent Laid Open Publication No. 2002-176427

SUMMARY OF THE INVENTION

Problem to be Solved by the Invention

However, when the transmission pulse width is set to about 0.5 μsec for the purpose of realizing a further high-speed transmission in the aforementioned bidirectional transmission system, the aforementioned conventional pulse width needs to be smaller to about 1/20. Therefore, the transmission frequency of 71.6 $MH_z$ and 120 $MH_z$ is selected.

Therefore, the transmitting/receiving coils L1, L2, 11, 12 can not but to be formed into one turn (0.1 μH) with diameter of 30φ, and are hardly incorporated into a product exceeding a manufacturing range of a general coil.

Accordingly, it is necessary to use a small coil such as a coil with diameter of 20φ or less, so as not to allow a great inductance to occur in the transmitting/receiving coils L1, L2, 11, 12. However, when the small coil is used, the mutual interference is generated easily as described above, and therefore improvement is desired from a viewpoint of ensuring an accurate transmission of the data signal.

There is also disclosed a structure of arranging a filter in a receiving circuit (not shown) connected to a stage subsequent to the receiving coils L2, 12, for attenuating the induced signal caused by the magnetic flux from the transmitting coils L1, 11.

However, in order to attenuate an induced voltage generated by the magnetic flux from the transmitting coils L1, 11 at the base part A side and the remote part B side, to a negligible extent, the number of stages of the filter needs to be increased, thus unfavorably resulting in an increase of a delay time in transmitting the signal.

In order to solve the above-described problem, the present invention is provided, and an object of the present invention is to provide the bidirectional transmission coil and the bidirectional transmission system using the same, capable of realizing miniaturization of the structure and reliable transmission of the data signal.

Means for Solving the Problem

In order to solve the above-described problem, claim 1 of the present invention provides a bidirectional transmission coil, comprising:
a loop-like transmitting coil for generating a magnetic flux of a transmission signal by a high frequency signal applied thereto;
a loop-like receiving coil arranged so that a central axis is positioned at a concentric position with the transmitting coil, for inducing a reception signal by the magnetic flux from outside; and
a loop-like first cancel coil connected to the transmitting coil in series so as to be led-out from the middle of the transmitting coil and led-in to the lead-out part, and arranged so as to sandwich the receiving coil between the transmitting coil and the first cancel coil, wherein the magnetic flux in a direction opposite to the magnetic flux from the transmitting coil is generated in the receiving coil.

Further, claim 2 of the present invention provides a bidirectional transmission coil, comprising a loop-like second cancel coil connected to the transmitting coil in series so as to be led-out from another position different from the position of the first cancel coil and led-in to the lead-out part in the transmitting coil, arranged so as to sandwich the receiving coil between the second cancel coil and the transmitting coil, wherein the magnetic flux in the direction opposite to the magnetic flux from the transmitting coil is generated in the receiving coil.

Claim 3 of the present invention provides the bidirectional transmission coil, wherein the transmitting coil and the receiving coil are arranged concentrically.

Claim 4 of the present invention provides the bidirectional transmission coil, wherein the first and the second cancel coils are led-out and led-in at a position diagonal to the transmitting coil.

Claim 5 of the present invention provides the bidirectional transmission coil, wherein the transmitting coil is arranged inside of the receiving coil, and the first and second cancel coils are positioned outside of the receiving coil.

Claim 6 of the present invention provides the bidirectional transmission coil, wherein in the first and second cancel coils, loop portions near a lead-out position and a lead-in position from/to the transmitting coil are formed into straight portions and in the transmitting coil, loop portions near the straight portions are formed straightly in parallel with each other.

Claim 7 of the present invention provides the bidirectional transmission coil, wherein the first and second cancel coils are formed so that an angle with respect to the plane of the transmitting coil and the receiving coil which are formed on the same plane is variably formed.

Claim 8 of the present invention provides the bidirectional transmission coil, wherein in the receiving coil, the first and second cancel coils generate the number of magnetic fluxes in the opposite direction, corresponding to the number of magnetic fluxes from the transmitting coil.

Claim 9 of the present invention provides a bidirectional transmission system, wherein a pair of the bidirectional transmission coils are arranged to face with each other, and a reception signal is induced by the other bidirectional transmission coil based on the magnetic flux from one of the bidirectional transmission coils, to thereby bidirectionally transmit transmission/reception signals by both bidirectional transmission coils.

Claim 10 of the present invention provides the bidirectional transmission system, wherein the bidirectional transmission coils having the same shape are arranged to face with each other.

Advantage of the Invention

In the bidirectional transmission coil according to claim 1 of the present invention, a loop-like first cancel coil for generating a magnetic flux in the receiving coil in a direction opposite to the magnetic flux from a transmitting coil, is arranged so as to sandwich a receiving coil between the first cancel coil and the transmitting coil. Thus, a current flowing through the transmitting coil flows through the first cancel coil in the middle, and a direction of the magnetic flux generated from the transmitting coil and the first cancel coil is reversed in the receiving coil, and is easily canceled. Therefore, an induced signal induced in the receiving coil due to the magnetic flux from the adjacent transmitting coil can be suppressed, and interference is suppressed between the induced signal and the induced signal caused by the magnetic flux from outside other than the transmitting coil, and therefore miniaturization of the structure and reliable transmission of the data signal are realized.

In the bidirectional transmission coil according to claim 2 of the present invention, another second cancel coil is connected in series from a different position of the transmitting coil, wherein the magnetic flux in the direction opposite to the direction of the magnetic flux from the transmitting coil is generated in the receiving coil. Therefore, the induced signal caused by the magnetic flux from the adjacent transmitting coil is further hardly induced in the receiving coil, and further miniaturization of the structure and reliable transmission of the data signal are realized.

In the bidirectional transmission coil according to claim 3 of the present invention, the transmitting coil and the receiving coil are arranged concentrically. Therefore, design and manufacture are easy, in addition to the aforementioned advantage.

In the bidirectional transmission coil according to claim 4 of the present invention, the first and second cancel coils are led-out and led-in at a position diagonal to the transmitting coil. Therefore, design and manufacture are easy, in addition to the aforementioned advantage.

In the bidirectional transmission coil according to claim 5 of the present invention, the transmitting coil is arranged inside of the receiving coil, and the first and second cancel coils are positioned outside of the receiving coil. Therefore, manufacture is easy, in addition to the aforementioned advantage.

In the bidirectional transmission coil according to claim 6 of the present invention, straight portions are formed in the first and second cancel coils, and in the receiving coil as well, loop portions adjacent to the straight portions are formed straightly in parallel with each other. Therefore, the induced signal caused by the magnetic flux from the adjacent transmitting coil is hardly induced in the receiving coil, and miniaturization of the structure and reliable transmission of the data signal are realized.

In the bidirectional transmission coil according to claim 7 of the present invention, the first and second cancel coils are formed so that an angle with respect to the plane of the transmitting coil and the receiving coil is variably formed. Therefore, adjustment is further easy, in addition to the aforementioned advantage.

In the bidirectional transmission coil according to claim 8 of the present invention, the number of magnetic fluxes in the opposite direction corresponding to the number of magnetic fluxes from the transmitting coil are generated in the receiving coil, by the first and second cancel coils. Therefore, the induced signal caused by the magnetic flux from the adjacent transmitting coil is further hardly induced in the receiving coil.

In the bidirectional transmission system according to claim 9 of the present invention, the bidirectional transmission coils are disposed to face with each other, and transmission/reception signals caused by the magnetic flux from mutual bidirectional transmission coils are bidirectionally transmitted. Therefore, miniaturization of the structure and reliable bidirectional transmission are realized.

In the bidirectional transmission system according to claim 10 of the present invention, the bidirectional transmission coils having the same shape are arranged to face with each other. Therefore, the structure and manufacture are easy.

BRIEF DESCRIPTION OF THE DRAWINGS OF THE INVENTION

BEST MODE FOR CARRYING OUT THE INVENTION

Preferred embodiments of the present invention will be described with reference to the drawings. Note that the same signs and numerals are assigned to the parts in common with a conventional example, as much as possible.

Figure 1:
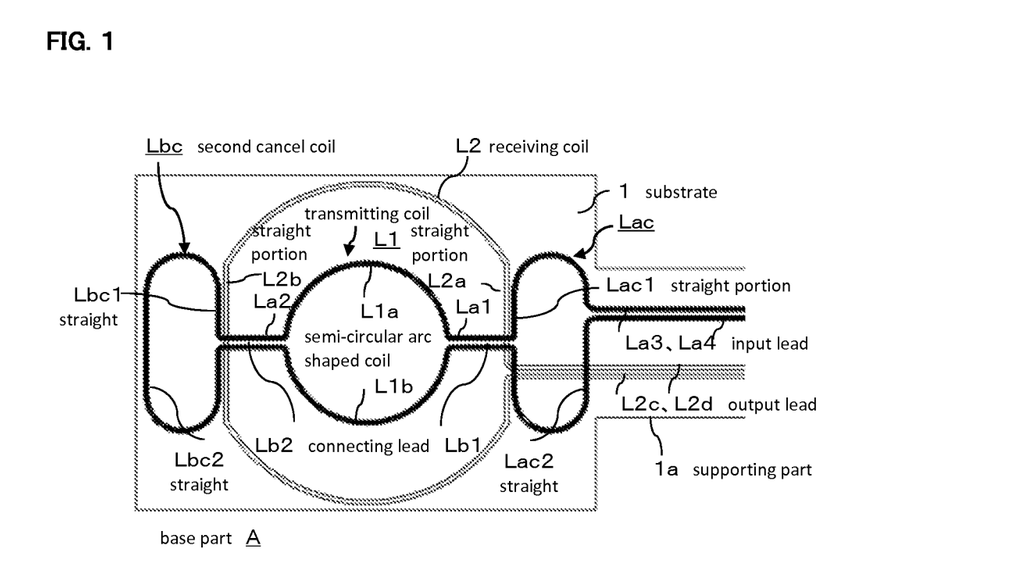
FIG. 1 is a planar view of a bidirectional transmission coil according to an embodiment of the present invention.

FIG. 1 is a planar view showing a bidirectional transmission coil according to an embodiment of the present invention.

In FIG. 1, a substrate 1 is a thin flexible sheet, for example, made of polyimide resin molded into a rectangular shape, with a supporting part 1a extending from a right end part in a laterally placed state, and is supported at a specified position of a fixed base part A such as a manufacturing device, etc., not shown.

A transmitting coil L1 is formed in a central part of the substrate 1. The transmitting coil L1 is formed into a circular loop shape, composed of semi-circular arc shaped coils L1a, L1b of approximately 180°.

Connecting leads La1, Lb1 are respectively extended from one of the end portions (right side in FIG. 1) of each of the semi-circular arc shaped coils L1a, L1b, to outside in parallel with each other with slight intervals between them, with tip end thereof widely opened at roughly a right angle, thus forming a corner-round rectangular loop-like first cancel coil Lac.

In the first cancel coil Lac, input leads La3, La4 are connected to opposed sides of the connecting leads La1, Lb1, in such a manner as extending over the supporting part 1a.

Connecting leads La2, Lb2 are extended from the other end portions (left side in FIG. 1) of the semi-circular arc shaped coils L1a and L1b in parallel with each other with slight interval between them, to outside at a position diagonal to the connecting leads La1, Lb2, with tip ends thereof widely opened at roughly a right angle, thus forming a corner-round rectangular loop-like second cancel coil Lbc.

Specifically, a serial circuit is formed, in which the transmitting coil L1 starts from the input lead La3, and reaches one end of the semi-circular arc shaped coil L1a through the first cancel coil Lac and the connecting lead La1, and reaches the second cancel coil Lbc from the other end of the semi-circular arc shaped coil L1a through the connecting lead La2, and reaches the semi-circular arc shaped coil L1b from the second cancel coil Lbc through the connecting lead Lb2, and reaches the first cancel coil Lac from the circular arc shaped coil L1b through the connecting lead Lb1, and reaches the input lead La4 from the first cancel coil Lac.

In other words, the first cancel coil Lac is connected to the transmitting coil L1 in series so as to be led-out from the middle of the transmitting coil L1 and is led-in to the lead-out part, and the second cancel coil Lbc is connected to the transmitting coil L1 in series so as to be led-out at a position diagonal to the transmitting coil L1 and is led-in to the lead-out part. In addition, the first and second cancel coils Lac, Lbc are connected to the transmitting coil L1 in series.

The first and second cancel coils Lac, Lbc are formed into a corner-round rectangular shape, and therefore linear straight portions Lac1, Lac2, Lbc1, and Lbc2 are formed by the side corresponding to the transmitting coil L1 in a tangential direction.

First and second cancel coils Lac, Lbc are formed by a publicly-known method (for example, by printing), on an outer periphery of the transmitting coil L1, with the circular loop-like receiving coil L2 and the transmitting coil L1 formed in a concentric state with central axes thereof at the same position. The transmitting coil L1 and the receiving coil L2 are formed in a state of being insulated electrically.

The receiving coil L2 is formed so as to be shifted to inner straight portions Lac1, Lbc1, in such a manner as being sandwiched by the transmitting coil L1 and the first and second cancel coils Lac, Lbc, and has straight portions L2a, L2b in parallel with the inner straight portions Lac1, Lbc1. Output leads L2c, L2d are extended over the supporting part 1a, from the straight portion L2a at the first cancel coil Lac side.

Next, the operation of the bidirectional transmission coil according to the present invention will be described, with reference to FIG. 2 and FIG. 3.

Figure 2:
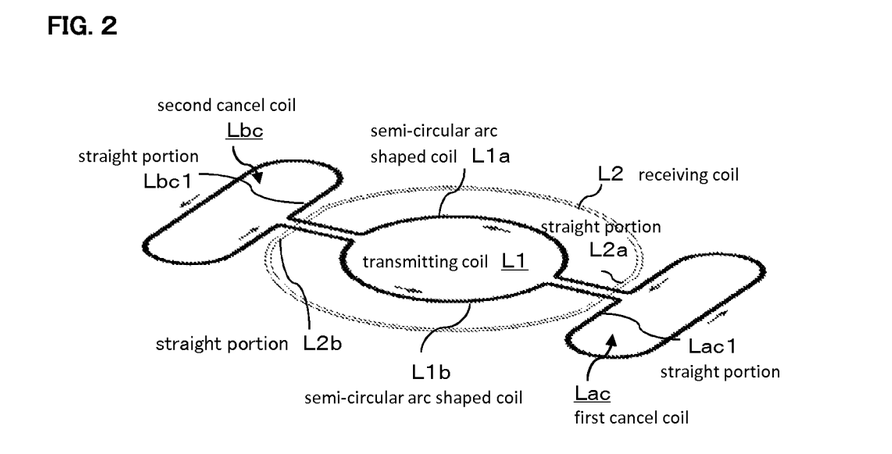
FIG. 2 is a schematic perspective view for explaining an operation of the bidirectional transmission coil according to the present invention.
Figure 3:
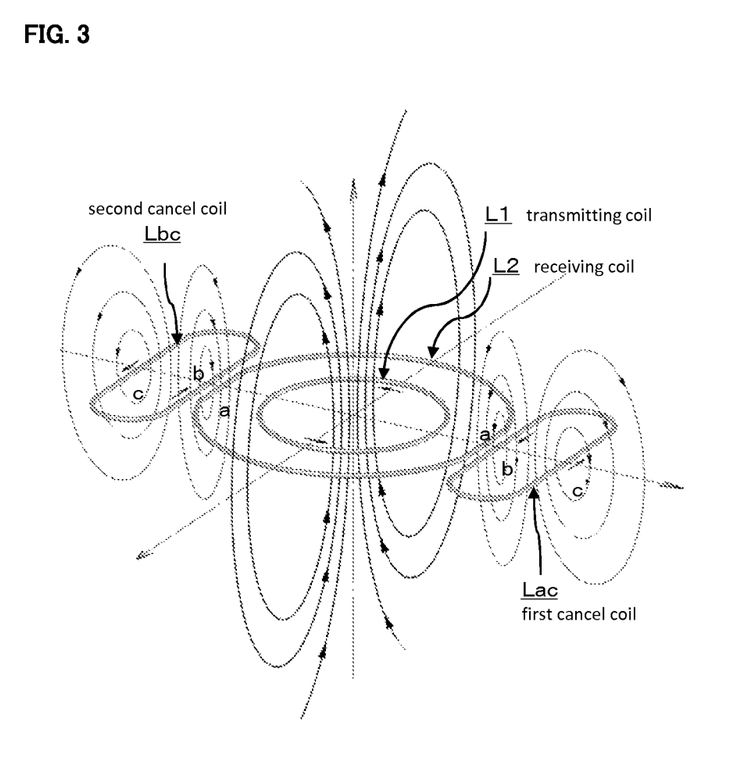
FIG. 3 is a schematic perspective view for explaining the operation of the bidirectional transmission coil according to the present invention.

FIG. 2 and FIG. 3 are schematic perspective views showing extraction of the transmitting coil L1 and the receiving coil L2 including the first and second cancel coils Lac, Lbc in the bidirectional transmission coil of FIG. 1, wherein the input leads La3, La4 and output leads L2c, L2d are omitted for the convenience of simplifying the figure. Arrows in FIG. 2 and FIG. 3 show driving currents flowing through the transmitting coil L1 and the first and second cancel coils Lac, Lbc.

Particularly, FIG. 3 shows the transmitting coil L1 and the second cancel coils Lac, Lbc independently. However, actually, as shown in FIG. 1, these coils are connected to each other in series, by the connecting leads La1 to Lb2.

A high-frequency signal (transmission signal) applied to the input lead La3 of the transmitting coil L1, flows to the input lead La4 from the first cancel coil Lac, the connecting lead La1, the semi-circular arc shaped coil L1a, the connecting lead La2, the second cancel coil Lbc, the connecting lead Lb2, the semi-circular arc shaped coil L1b, the connecting lead Lb1, and the first cancel coil Lac. Thus, as shown in FIG. 3, the magnetic flux is generated in the transmitting coil L1 and the first and second cancel coils Lac, Lbc.

In FIG. 3, large arrows show the magnetic flux (in the Y-direction) generated in the transmitting coil L1 at a part where the first and second cancel coils Lac, Lbc don't exist, and small arrows show the magnetic flux (in the X-direction) generated in the first and second cancel coils Lac, Lbc.

In addition, generally, strength of a magnetic field (density of the magnetic flux) in a surrounding space is inversely proportional to a vertical distance from a conductive wire, and is proportional to a current (Biot-Savart law). Therefore, in FIG. 3, a voltage induced in the receiving coil L2 is caused by the density of the magnetic flux from the semi-circular arc shaped coils L1a, L1b, being the transmitting coil L1, and the first and second cancel coils Lac, Lbc.

Then, regarding the first and second cancel coils Lac, Lbc, the receiving coil L2 is greatly affected by the magnetic flux from the straight portions Lac1, Lbc1, because the straight portions Lac1, Lbc1 in the first and second cancel coils Lac, Lbc are arranged adjacently to the receiving coil L2. Other portions of the first and second cancel coils Lac, Lbc are located at a certain distance from the receiving coil L2, and therefore the receiving coil L2 is slightly affected by the magnetic flux from this part.

In addition, the direction of the magnetic flux from the semi-circular arc shaped coils L1a, L1b and the direction of the magnetic flux from the first and second cancel coils Lac, Lbc are opposite to each other. Namely, the first and second cancel coils Lac, Lbc have a function of generating the magnetic flux in the receiving coil L2, in the direction opposite to the magnetic flux from the semi-circular arc shaped coils L1a, L1b.

Further, the receiving coil L2 is affected by the magnetic flux from the semi-circular arc shaped coils L1a, L1b, by facing with the semi-circular arc shaped coils L1a, L1b on the whole circumference thereof. However, although the receiving coil L2 is affected by the magnetic flux from the first and second cancel coils Lac, Lbc by facing with the receiving coil L2 partially, the straight portions Lac1, Lbc1 are arranged more closely than the semi-circular arc shaped coils L1a, L1b, and therefore the receiving coil L2 is affected by the magnetic flux from the first and second cancel coils Lac, Lbc further strongly. Thus, the magnetic flux from the semi-circular arc shaped coils L1a, L1b, and the magnetic flux from the first and second cancel coils Lac, Lbc are canceled.

Thus, by arranging the first and second cancel coils Lac, Lbc more closely to the receiving coil L2 than the semi-circular arc shaped coils L1a, L1b, the magnetic flux from the transmitting coil L1 can be easily canceled by the magnetic flux from the first and second cancel coils Lac, Lbc, and generation of the voltage applied to the receiving coil L2 from its own transmitting coil L1 can be suppressed.

As described above, the bidirectional transmission coil of the present invention comprises:

the loop-like transmitting coil L1 for generating the magnetic flux of the transmission signal by the high frequency signal applied thereto;

the loop-like receiving coil L2 arranged to be positioned concentrically with the transmitting coil L1, for inducing the reception signal by the magnetic flux from outside;

the first cancel coil Lac connected to the transmitting coil L1 in series so as to be led-out from the middle of the transmitting coil L1 and led-in to the lead-out part, and is arranged so as to sandwich the receiving coil L2 between the first cancel coil Lac and the transmitting coil L1; and the loop-like second cancel coil Lbc which is located in the transmitting coil and is connected to the transmitting coil in series so as to be led-out at a position diagonal to the first cancel coil and led-in to the lead-out part, and is arranged so as to sandwich the receiving coil between the second cancel coil Lbc and the transmitting coil L1, wherein the first and second cancel coils Lac, Lbc have a function of generating the magnetic flux in the receiving coil L2, in the direction opposite to the magnetic flux from the transmitting coil L1.

Therefore, when the transmitting coil L1, the receiving coil L2, and the first and second cancel coils Lac, Lbc are arranged with proper sizes and at proper positions, the receiving coil L2 is hardly affected by the magnetic flux generated from its own transmitting coil L1, and the generation of the voltage applied to the receiving coil L2 can be suppressed.

Therefore, even if miniaturizing the transmitting coil L1 and the receiving coil L2 or narrowing the interval, the data signal caused by the magnetic flux from the outside other than its own transmitting coil L1 can be accurately received.

According to an experiment performed by inventors of the present invention, the generation of the voltage applied to the receiving coil L2 caused by the magnetic flux generated from its own transmitting coil L1 can be attenuated by about 40 dB.

In addition, the straight portions Lac1, Lbc1 are formed by the loop portions near the lead-out and lead-in portions from/into the transmitting coil L1 in the first and second cancel coils Lac, Lbc, and the loop portions adjacent to the straight portions Lac1, Lbc1 in the receiving coil L2 are formed straightly in parallel with each other. Therefore, it becomes easy to manufacture the first and second cancel coils Lac, Lbc, and it becomes easy to adjust the influence of the magnetic flux from the transmitting coil L1.

Incidentally, the object of the present invention is reliably achieved by a structure of the first and second cancel coils Lac, Lbc in the bidirectional transmission coil of the present invention, wherein the number of magnetic fluxes are generated in the receiving coil L2, in the opposite direction corresponding to total numbers of the magnetic fluxes generated from the transmitting coil L1.

Figure 4:
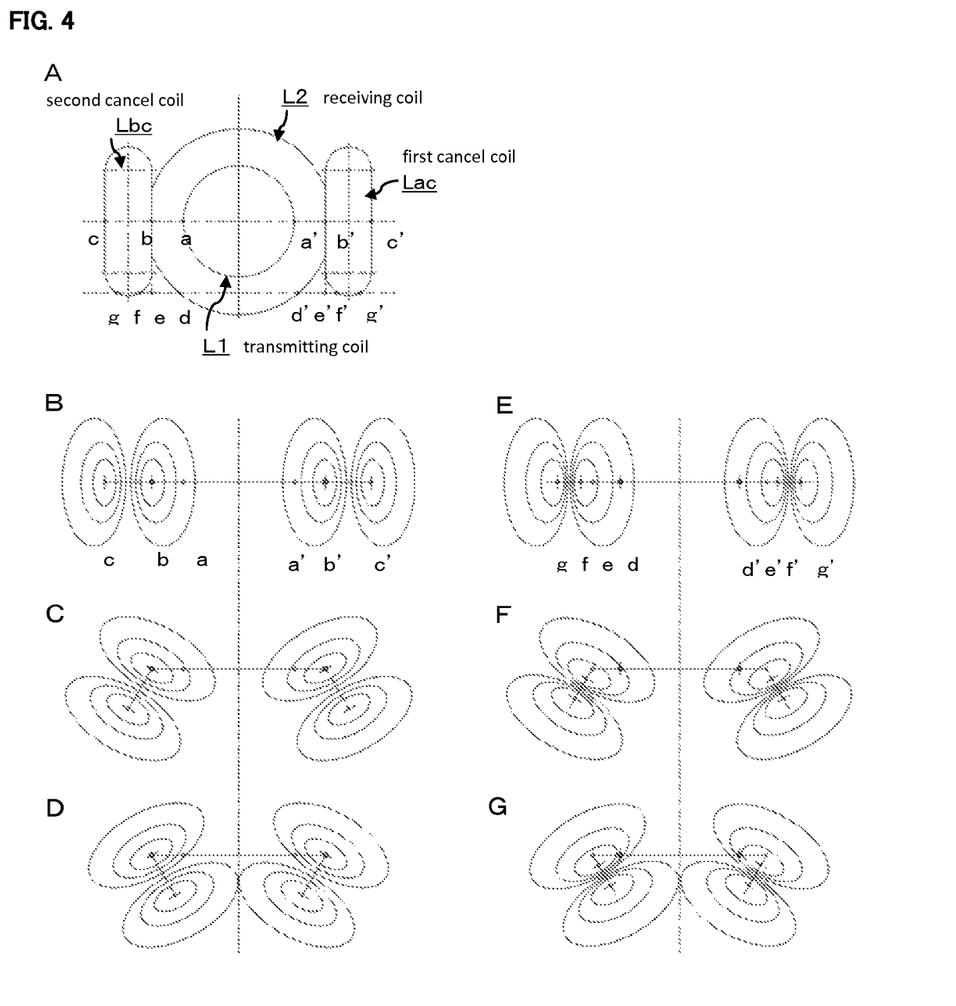
FIG. 4 is a schematic perspective view for explaining a bidirectional transmission system according to other embodiment of the present invention.

Next, the bidirectional transmission coil according to other embodiment of the present invention will be described.

FIG. 4 is a schematic view for explaining the bidirectional transmission coil according to other embodiment of the present invention.

FIG. 4A is a planar view of the bidirectional transmission coil of FIG. 3, and designation marks a, a', b, b', c, c' of FIG. 4 show the same place indicated by the designation marks a, a', b, b', c, c' of FIG. 3.

At the portions indicated by designation marks b, b' in FIG. 4A, a plane of the first cancel coil Lac and a plane of the second cancel coil Lbc are allowable to bend and displace at a certain angle, with respect to a plane of the transmitting coil L1 and the receiving coil L2, and a cancel amount for canceling the magnetic flux generated from the transmitting coil L1 can be controlled by this bending angle.

Here, when a relation between cancel amounts of the transmitting coil L1 and the first and second cancel coils Lac, Lbc, is taken into consideration, as shown in FIG. 4B to FIG. 4D, at parallel adjacent portions indicated by designation marks b, b', there is no variation in distance between the transmitting coil L1 and the first and second cancel coils Lac, Lbc even if the first and second cancel coils Lac, Lbc are bent, and therefore the cancel amount is not changed.

Meanwhile, at positions indicated by designation marks d, d', e,e', f,f', g, g', the receiving coil L2 and the first and second cancel coils Lac, Lbc are set in a positional relation of being separated from each other. Therefore, when being bent at the positions indicated by the designation marks b, b', as shown in FIG. E to FIG. G, interval between designation marks d and f, and interval between designation marks d' and f' are changed. Then, a degree of the influence given to the receiving coil L2 by the magnetic flux from the straight portions Lac1, Lbc1 is changed in the first and second cancel coils Lac, Lbc, thereby changing the influence of the magnetic flux given to the receiving coil L2, and also changing the cancel amount.

Thus, the cancel amount can be controlled when the angle formed by the plane of the first and second cancel coils Lac, Lbc, and the plane of the transmitting coil L1 and the receiving coil L2, is variably formed.

Generally, the bidirectional transmission coil of the present invention is merchandized by supporting it by a ferrite core, etc., in many cases.

In this case, under the influence of the ferrite core, it is difficult to uniquely determine the size and arrangement of constitutional elements, and as described above, by variably forming a plane angle of the first and second cancel coils Lac, Lbc, with respect to the plane of the transmitting coil L1 and the receiving coil 12, control of a cancelling effect is facilitated, which is useful for characteristic adjustment.

Incidentally, the bidirectional transmission coil of the present invention is not limited to the aforementioned structure. For example, the cancel coil is not limited to two cancel coils, such as first and second cancel coils Lac, Lbc, and is arbitrarily set to be one or more. Also, the lead-out position of the first and second cancel coils Lac, Lbc is not limited to the diagonal position, and can be arbitrarily set. When two cancel coils are arranged at the diagonal position, the receiving coil L2 is further hardly affected by the induced signal caused by the magnetic flux generated from the transmitting coil L1, and further miniaturization and further reliable transmission of the data signal is realized, and design and adjustment are also easy.

Further, structures of the transmitting coil L1 and the receiving coil L2 are not limited to an arrangement on the same plane, with centers thereof aligned with the concentric position. Instead, the central axes thereof may be aligned with the concentric position. However, design, adjustment, and manufacture are more facilitated and miniaturization is more facilitated, in a case that the transmitting coil L1 and the receiving coil L2 are constituted to be aligned with the concentric position on the same plane.

Further, by forming the receiving coil L2 outside of the transmitting coil L1 and arranging the first and second cancel coils Lac, Lbc extending from the transmitting coil L1, adjacently to the receiving coil L2, with the receiving coil L2 sandwiched between them, manufacture is facilitated, further miniaturization and reliable transmission of the data signal are realized, and design and adjustment are also easy.

Figure 5:
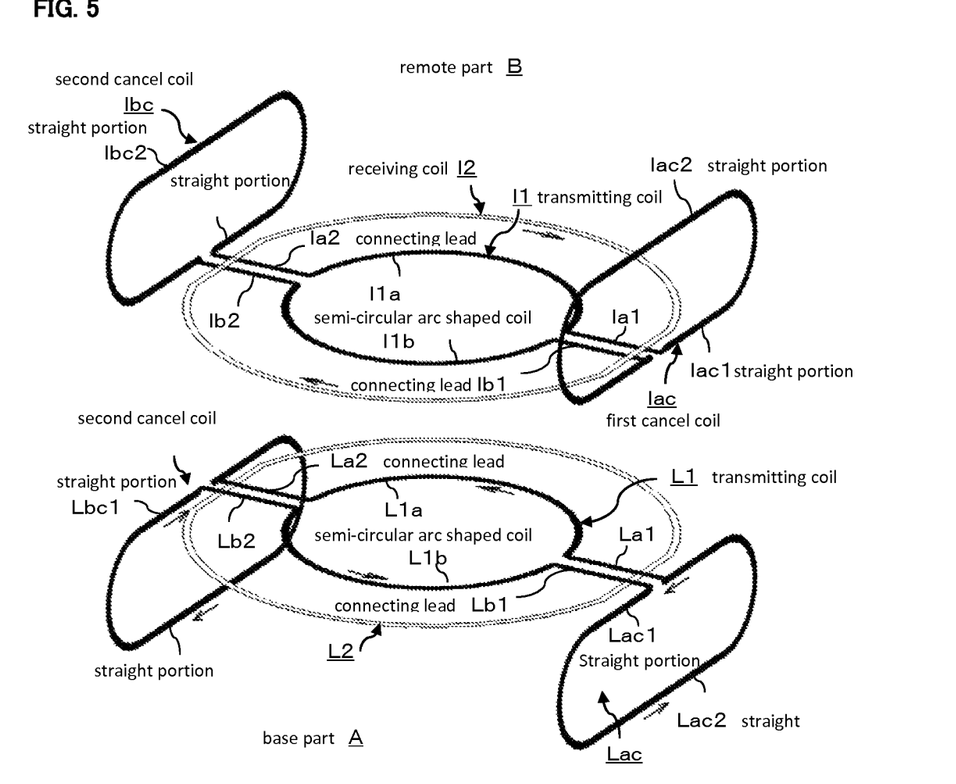
FIG. 5 is a schematic perspective view for explaining the bidirectional transmission system according to an embodiment of the present invention.
Figure 6:
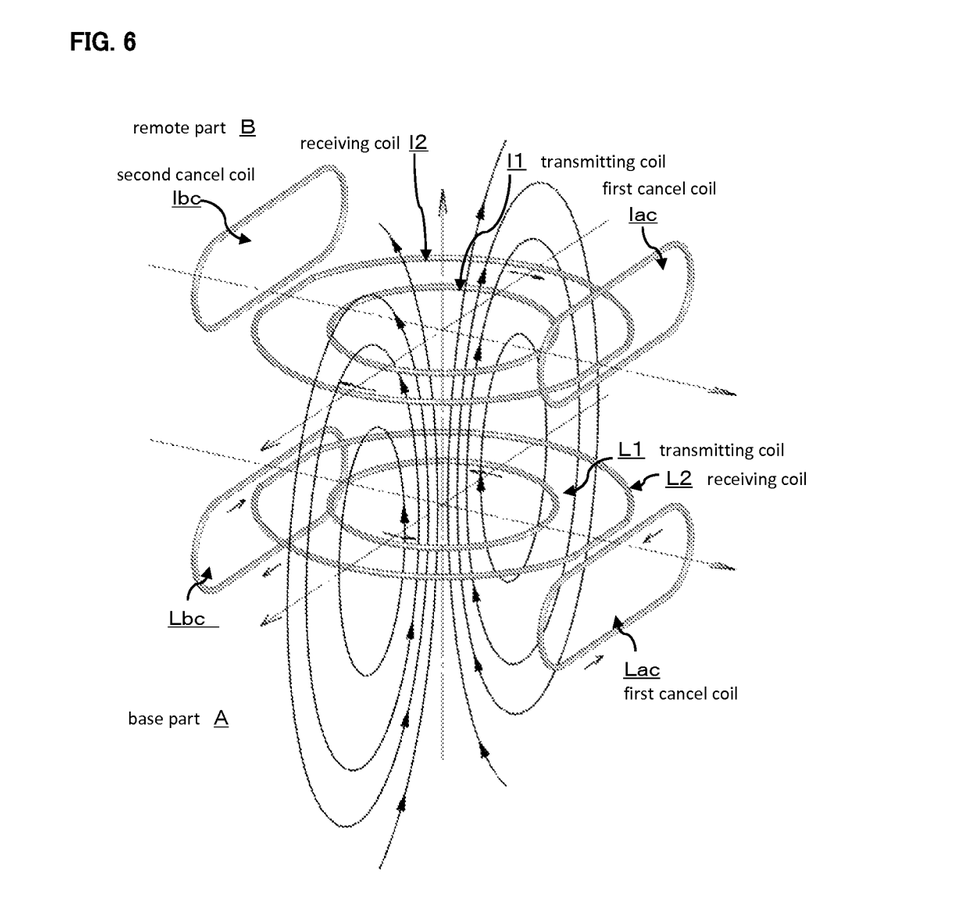
FIG. 6 is a schematic perspective view for explaining the operation of the bidirectional transmission system of FIG. 5.

Next, a bidirectional transmission system using the bidirectional transmission coil of the present invention, according to an embodiment of the present invention will be described.

FIG. 5 and FIG. 6 are schematic perspective views of the bidirectional transmission system according to an embodiment of the present invention.

In FIG. 5, the transmitting coil L1, semi-circular arc shaped coils L1a, L1b, first and second cancel coils Lac, Lbc, connecting leads La1, Lb1, La2, Lb2, input leads La3, La4, and receiving coil L2, etc., are bidirectional transmission coils arranged at the base part A side, and are similar to those of the aforementioned FIG. 1 to FIG. 4.

Meanwhile, in FIG. 5, the bidirectional transmission coil arranged at the remote part B side is composed of the transmitting coil 11, semi-circular arc shaped coils 11a, 11b, first and second cancel coils lac, 1bc, connecting leads 1a1, 1b1, 1a2, 1b2, input leads 1a3, 1a3, and receiving coil 12, etc., and is arranged to face with the bidirectional transmission coil which is arranged at the base part A side.

The shape, arrangement, and function of the individual coil, etc., of the bidirectional transmission coil arranged at the remote part B side are approximately the same as those of the bidirectional transmission coil arranged at the base part A side, and therefore detailed explanation thereof is omitted.

Note that the first and second cancel coils Lac, Lbc, lac, and lbc are formed approximately perpendicularly to the plane of the transmitting coils L1, 11 and the receiving coils L2, 12.

Then, the bidirectional transmission system according to the present invention is capable of inducing the reception signal by the bidirectional transmission coil at the remote part B side based on the magnetic flux from the bidirectional transmission coil at the base part A side, and inducing the reception signal by the bidirectional transmission coil at the base part A side based on the magnetic flux from the bidirectional transmission coil at the remote part B side, thus allowing the transmission/reception signal to be bidirectionally transmitted to the bidirectional transmission coil at both the base part A side and remote part B side.

Description of Signs and Numerals

1 Substrate
1a Supporting part
A Base part
B Remote part
L1, 11 Transmitting coil
L1A, L1b, 11a, 11b Semi-circular arc shaped coil
La1, La2, Lb1, Lb2, la1, la2, lb1, lb2 Connecting lead
Lac, lac First cancel coil
La3, La4 Input lead
Lbc, lbc Second cancel coil
L2, 12 Receiving coil
Lac1, Lac2, Lbc1, Lbc2, L2a, L2b, lac1, lac2, 12a, 12b Straight portion
L2c, L2d Output lead

The invention claimed is:

1. A bidirectional transmission coil, comprising:
a loop-like transmitting coil for generating a magnetic flux of a transmission signal by a high frequency signal applied thereto;
a loop-like receiving coil arranged so that a central axis is positioned at a concentric position with the transmitting coil, for inducing a reception signal by the magnetic flux from outside; and
a loop-like first cancel coil connected to the transmitting coil in series so as to be led-out from the middle of the transmitting coil and led-in to the lead-out part, and arranged so as to sandwich the receiving coil between the transmitting coil and the first cancel coil, wherein the magnetic flux in the direction opposite to the magnetic flux from the transmitting coil is generated in the receiving coil.

2. A bidirectional transmission coil according to claim 1, comprising a loop-like second cancel coil connected to the transmitting coil in series so as to be led-out from another position different from the position of the first cancel coil and led-in to the lead-out part in the transmitting coil, arranged so as to sandwich the receiving coil between the second cancel coil and the transmitting coil, wherein the magnetic flux in the direction opposite to the magnetic flux from the transmitting coil is generated in the receiving coil.

3. The bidirectional transmission coil according to claim 2, wherein the first and the second cancel coils are led-out and led-in at a position diagonal to the transmitting coil.

4. The bidirectional transmission coil according to claim 2, wherein the transmitting coil is arranged inside of the receiving coil, and the first and second cancel coils are positioned outside of the receiving coil.

5. The bidirectional transmission coil according to claim 2, wherein in the first and second cancel coils, loop portions near a lead-out position and a lead-in position from/to the transmitting coil are formed into straight portions and in the transmitting coil, loop portions near the straight portions are formed straightly in parallel with each other.

6. The bidirectional transmission coil according to claim 2, wherein in the receiving coil, the first and second cancel coils generate the number of magnetic fluxes in an opposite direction, corresponding to the number of magnetic fluxes from the transmitting coil.

7. The bidirectional transmission coil according to claim 1, wherein the transmitting coil and the receiving coil are arranged concentrically.

8. The bidirectional transmission coil according to claim 1, wherein the first and second cancel coils are formed so that an angle with respect to the plane of the transmitting coil and the receiving coil which are formed on the same plane is variably formed.

9. A bidirectional transmission system, wherein a pair of the bidirectional transmission coils according to claim 1 are arranged to face with each other, and a reception signal is induced by the other bidirectional transmission coil based on the magnetic flux from one of the bidirectional transmission coils, to thereby bidirectionally transmit transmission/reception signals by both the bidirectional transmission coils.

10. The bidirectional transmission system according to claim 9, wherein the bidirectional transmission coils having the same shape are arranged to face with each other.

* * * * *